United States Patent
Saito (10) Patent No.: US 8,318,372 B2
(45) Date of Patent: Nov. 27, 2012

(54) FUEL CELL STACK AND VEHICLE EQUIPPED WITH FUEL CELL SYSTEM

(75) Inventor: Norihiko Saito, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 347 days.

(21) Appl. No.: 12/597,265

(22) PCT Filed: Apr. 25, 2008

(86) PCT No.: PCT/JP2008/058459
§ 371 (c)(1),
(2), (4) Date: Oct. 23, 2009

(87) PCT Pub. No.: WO2008/139988
PCT Pub. Date: Nov. 20, 2008

(65) Prior Publication Data
US 2010/0133028 A1  Jun. 3, 2010

(30) Foreign Application Priority Data
Apr. 27, 2007  (JP) .................................. 2007-118740

(51) Int. Cl.
*H01M 8/24* (2006.01)
*B60K 1/04* (2006.01)
(52) U.S. Cl. ........ 429/469; 429/470; 429/508; 429/511; 180/65.31
(58) Field of Classification Search .................... 429/469
See application file for complete search history.

(56) References Cited

U.S. PATENT DOCUMENTS

| 4,774,154 A | * | 9/1988 | Singelyn et al. | 429/460 |
| 6,200,698 B1 | * | 3/2001 | Carlstrom, Jr. | 429/465 |
| 2006/0024557 A1 | | 2/2006 | Iritsuki et al. | |
| 2009/0000732 A1 | * | 1/2009 | Jacobine et al. | 156/273.5 |

FOREIGN PATENT DOCUMENTS

| JP | 1289072 A | 11/1989 |
| JP | 08162143 A | 6/1996 |
| JP | 2001093563 A | 4/2001 |
| JP | 2003203670 A | 7/2003 |
| JP | 2003297377 A | 10/2003 |
| JP | 2005056814 A | 3/2005 |
| JP | 2006108009 A | 4/2006 |
| WO | WO-2005008826 A1 | 1/2005 |

* cited by examiner

*Primary Examiner* — John S Maples
(74) *Attorney, Agent, or Firm* — Gifford, Krass, Sprinkle, Anderson & Citkowski, P.C.

(57) ABSTRACT

A fuel cell stack in accordance with the invention has a cell laminate obtained by stacking multiple plates with at least one of functions of a power generation assembly and a separator, and a pair of end plates located outside and on both ends of the cell laminate in a stacking direction. The fuel cell stack further includes a displacement preventing member extended along the stacking direction of the cell laminate and fastened to the pair of end plates, and a deformable intermediate material located between the cell laminate and the displacement preventing member over an area of two or more plates among the multiple plates. At least either one of the two or more plates and the displacement preventing member is designed to have a concavo-convex shape formed at least partially on a face in contact with the intermediate material. Such a simple structure of the fuel cell stack effectively enhances the resistance against an inertial force acting in an in-plane direction that is perpendicular to the stacking direction.

6 Claims, 9 Drawing Sheets

FIRST EMBODIMENT

FUEL CELL STACK AND VEHICLE EQUIPPED WITH FUEL CELL SYSTEM

CROSS-REFERENCE TO RELATED APPLICATIONS

This application is the U.S. national phase of PCT/JP2008/058459 filed Apr. 25, 2008, which claims priority of Japanese Patent Application No. JP 2007-118740 filed Apr. 27, 2007.

TECHNICAL FIELD

The present invention relates to a fuel cell stack.

BACKGROUND ART

One prior art structure of a fuel cell stack mountable on a vehicle has a cell laminate obtained by alternately stacking plates with the function of a power generation assembly and plates with the function of a separator. The fuel cell stack of this prior art structure has a problem of low resistance against an inertial load in a direction (may be referred to as 'in-plane direction' in the description herein) perpendicular to a stacking direction of the respective plates (may be simply referred to as 'stacking direction' in the description herein). Each plate generates a drag in a plane-pressing direction against an inertial load in the stacking direction, while generating a drag from a frictional force acting on an interface between each adjacent pair of plates against the inertial load in the in-plane direction. One proposed structure as disclosed in JP-A-2006-108009 forms a recess along the periphery of each plate and uses a casing with a specific mating shape with the recess to prevent a potential displacement of the plate in the in-plane direction.

DISCLOSURE OF THE INVENTION

The mating-based restriction, however, causes concentration of the inertial load on a mated region and requires the increased rigidity on the peripheries of the casing and the plates. This undesirably leads to weight increase. The mating-based restriction also requires strict shape tolerances and assembling accuracies for the respective plates and the casing.

In order to solve the problem of the prior art discussed above, there would thus be a demand for providing a technique applied to a fuel cell stack to enhance the resistance against an inertial load acting on an in-plane direction perpendicular to a stacking direction of a cell laminate by a simple structure.

The present invention accomplishes at least part of the demand mentioned above and the other relevant demands by variety of configurations and arrangements discussed below.

According to one aspect, the invention is directed to a fuel cell stack, which includes a cell laminate obtained by stacking multiple plates with at least one of functions of a power generation assembly and a separator, and a pair of end plates located outside and on both ends of the cell laminate in a stacking direction. The fuel cell stack further includes a displacement preventing member extended along the stacking direction of the cell laminate and fastened to the pair of end plates, and a deformable intermediate material located between the cell laminate and the displacement preventing member over an area of two or more plates among the multiple plates. At least either one of the two or more plates and the displacement preventing member is designed to have a concavo-convex shape formed at least partially on a face in contact with the intermediate material.

In the fuel cell stack according to this aspect of the invention, the deformable intermediate material is located between the cell laminate and the displacement preventing member over the area of two or more plates among the multiple plates. At least either one of the two or more plates and the displacement preventing member is designed to have the concavo-convex shape formed at least partially on the face in contact with the intermediate material. The concavo-convex shape gives an effect equivalent to the state of engagement with the deformable intermediate material, thus generating a large frictional force. This engagement effect is readily attained without a requirement for considering the mating of the concavo-convex shape.

The deformation of the 'intermediate material' includes (1) elastic deformation of an elastic intermediate material, such as a polyurethane sheet or a rubber material, caused by the plates or the displacement preventing member pressed against the intermediate material and (2) pre-cured deformation of a curable intermediate material, such as a resin or an adhesive. The terminology 'cell laminate obtained by stacking multiple plates with at least one of functions of a power generation assembly and a separator' includes cell laminates of various configurations, for example, 'cell laminate obtained by alternately stacking multiple plates with the function of the power generation assembly and multiple plates with the function of the separator', 'cell laminate obtained by stacking multiple plates with both the functions of the power generation assembly and the separator', and 'cell laminate obtained by stacking multiple plate groups, where each plate group includes a plate with the function of the power generation assembly located between two plates with the function of the separator'.

In one preferable embodiment of the invention, the fuel cell stack of the above aspect further includes a fastener member configured to compress and bias the pair of end plates in the stacking direction on both ends of the cell laminate in the stacking direction. The fastener member and the displacement preventing member are structurally integrated. In the fuel cell stack of this embodiment, the structural integrity of the fastener member and the displacement preventing member further increases the rigidity of the displacement preventing member.

In one preferable application of the fuel cell stack according to the above aspect of the invention, the intermediate material is an elastic material. The displacement preventing member is arranged to compress and bias the cell laminate in a direction perpendicular to the stacking direction. This arrangement readily gives an effect equivalent to the state of engagement, thus effectively enhancing the assembling property and the reusability.

In another preferable embodiment of the invention, the fuel cell stack of the above aspect further includes a strip-shaped member designed to have a closed profile covering over periphery of the cell laminate and the displacement preventing member about an axis in the stacking direction and configured to compress and bias the displacement preventing member from the periphery of the cell laminate. In the fuel cell stack of this embodiment, a tensile load is generated on the strip-shaped member. This arrangement thus effectively increases the biasing force of the displacement preventing member.

According to another aspect, the invention is also directed to a vehicle equipped with a fuel cell system. The vehicle has the fuel cell system configured to include a fuel cell stack, and a drive system configured to consume an electric power supplied from the fuel cell system and drive the vehicle. The fuel cell stack includes a cell laminate obtained by stacking multiple plates with at least one of functions of a power generation assembly and a separator, and a pair of end plates located outside and on both ends of the cell laminate in a stacking direction. The fuel cell stack further includes a displacement preventing member extended along the stacking direction of the cell laminate and fastened to the pair of end plates, and a deformable intermediate material located between the cell laminate and the displacement preventing member over an area of two or more plates among the multiple plates. At least either one of the two or more plates and the displacement preventing member is designed to have a concavo-convex shape formed at least partially on a face in contact with the intermediate material.

The technique of the invention is actualized by diversity of other applications including a fuel cell system and a method of manufacturing a fuel cell stack.

BEST MODES OF CARRYING OUT THE INVENTION

Some modes of carrying out the invention are discussed below as preferred embodiments with reference to the accompanied drawings.

A. Structure of Fuel Cell Stack in First Embodiment of the Invention

Figure 1A:
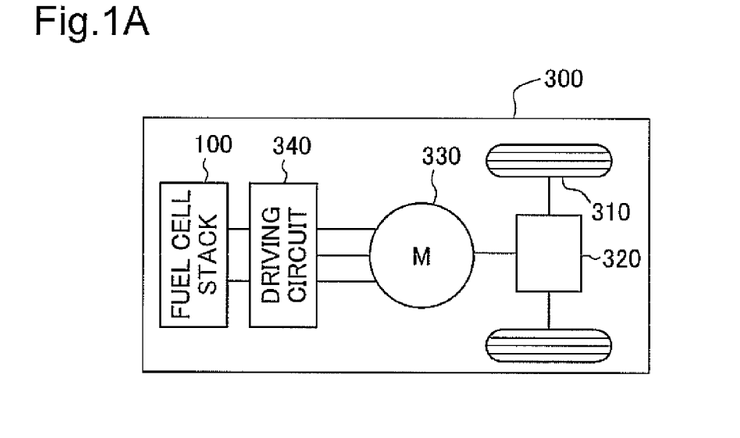
FIG. 1A is an explanatory view illustrating the configuration of a vehicle in accordance with one embodiment of the invention.

FIG. 1A is an explanatory view illustrating the configuration of a vehicle equipped with a fuel cell stack in one embodiment of the invention. As illustrated, a vehicle 300 includes a fuel cell stack 100, a motor 330 as a drive source of the vehicle 300, and a driving circuit 340 configured to consume electric power supplied from the fuel cell stack 100 and drive the motor 330. The power generated by the motor 330 is transmitted via a gear box 320 to a pair of drive wheels 310. The motor 330 is a three-phase motor with permanent magnets. The driving circuit 340 uses switching elements (not shown) to convert the direct-current power obtained from the fuel cell stack 100 into three-phase alternating-current driving power and supplies the three-phase alternating-current driving power to the motor 330.

Figure 1B:
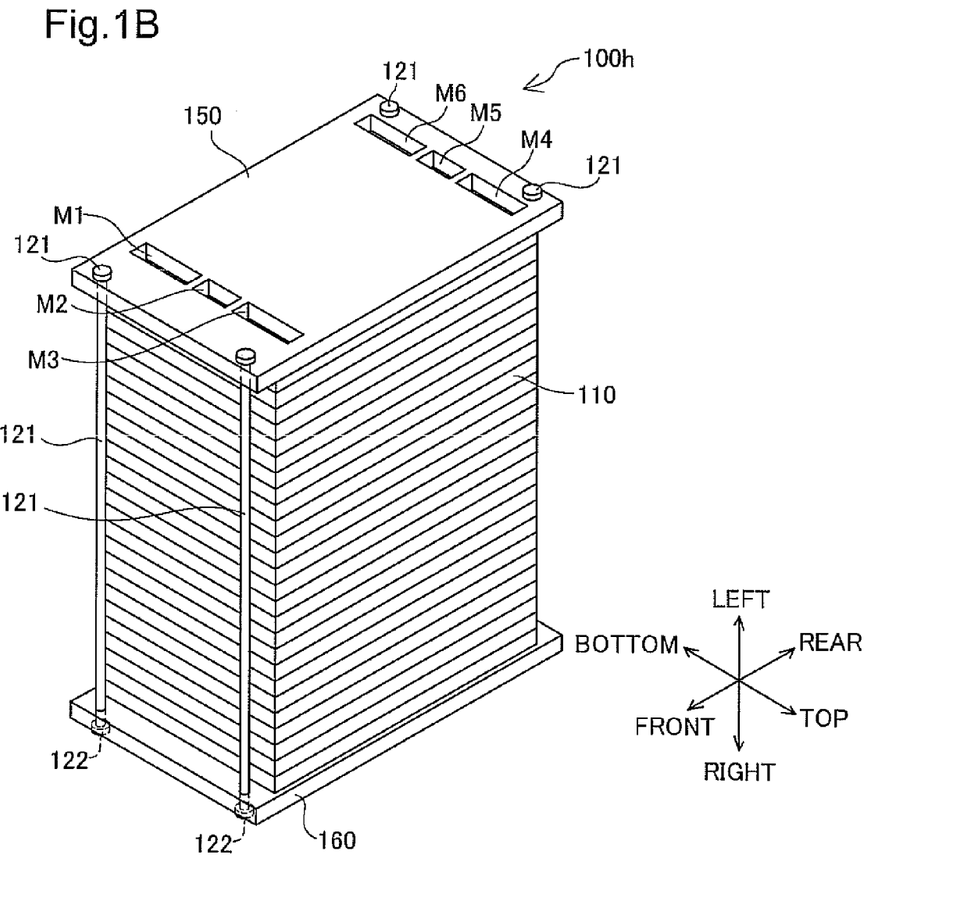
FIG. 1B is an explanatory view showing the structure of a fuel cell stack 100h in a semi-finished state in a first embodiment of the invention.

The fuel cell stack 100 is described below. FIG. 1B is an explanatory view showing the fuel cell stack 100 of the embodiment in a semi-assembled state. Displacement preventing members 200 (discussed later) are attached to the fuel cell stack 100 in the actual state. In order to clarify the functions of the displacement preventing members 200 in the structure of the embodiment, the fuel cell stack in a semi-finished state before attachment of the displacement preventing members 200 (hereafter referred to as semi-finished fuel cell stack 100h) is explained first. The semi-finished fuel cell stack 100h includes a cell laminate 110, one pair of end plates 150 and 160 located on both ends of the cell laminate 110 in its stacking direction (in a left-right direction in the illustration of FIG. 1), and four sets of bolts 121 and nuts 122 used to fasten the pair of end plates 150 and 160 to the cell laminate 110. Each of multiple plates included in the semi-finished fuel cell stack 100h has openings pierced for the flows of a fuel gas, an oxidizing gas, and a coolant. In lamination of the multiple plates, the openings of the plates form manifold holes M1 to M6 for the flows of the fuel gas, the oxidizing gas, and the coolant.

The coordinate system of FIG. 1B defines directions of the fuel cell stack 100h mounted in a certain orientation on the vehicle 300. A front-rear direction shown in FIG. 1B corresponds to a vehicle longitudinal direction. A left-right direction and a top-bottom direction shown in FIG. 1B respectively correspond to a vehicle transverse direction and a vehicle vertical direction. The general design of a vehicle is based on the assumption that a largest impact could be applied in the vehicle longitudinal direction by taking into account the possibility of a crash or a rear-end collision. The fuel cell stack is thus designed on the premise of a force possibly applied to the fuel cell stack by such an impact.

Figure 2:
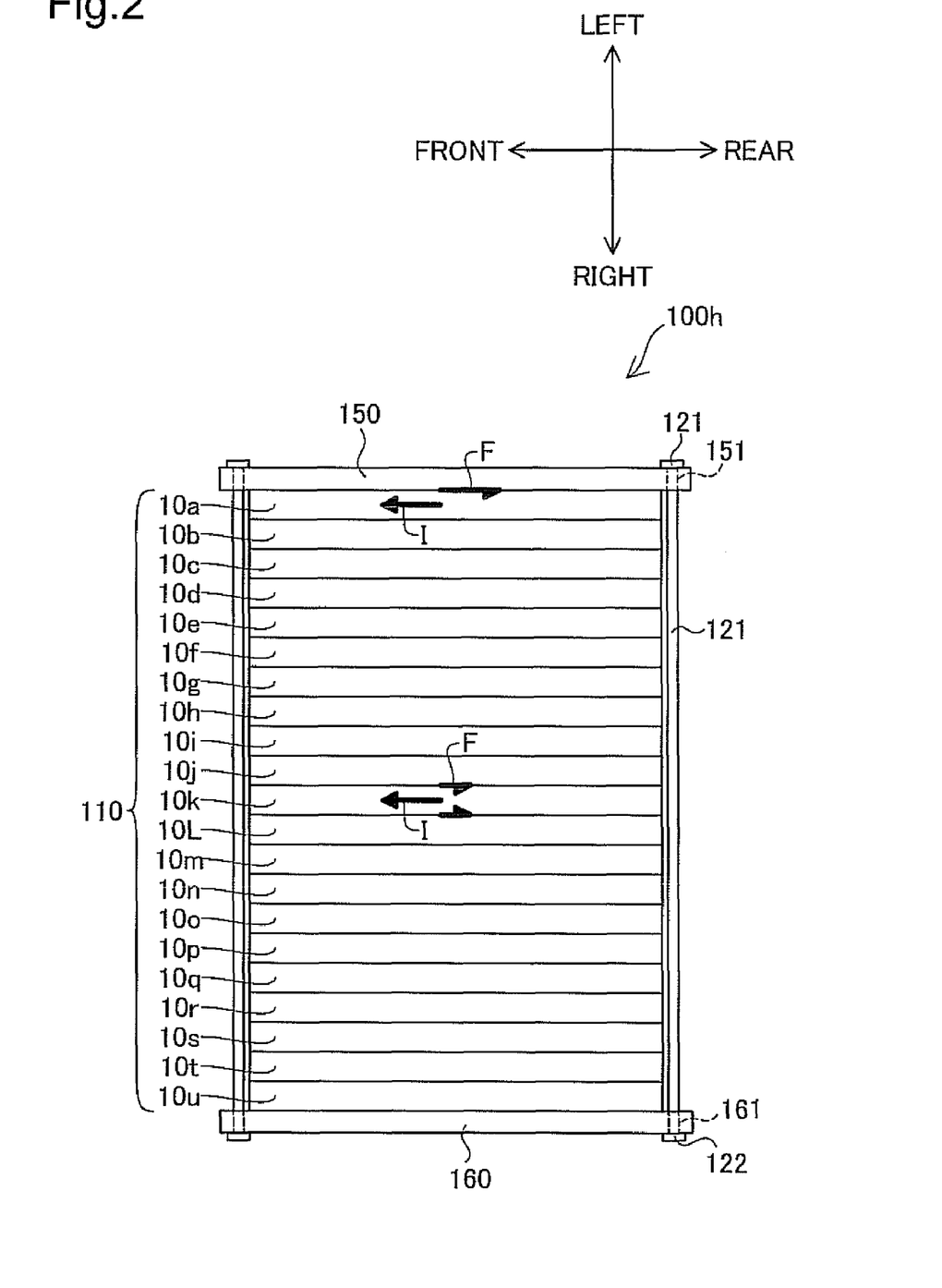
FIG. 2 is a top view of the semi-finished fuel cell stack 100h.

FIG. 2 is a top view of the semi-finished fuel cell stack 100h, seen from the top in the coordinate system of FIG. 1B. The cell laminate 110 is obtained by stacking multiple plates 10a through 10u in the structure of the embodiment. The multiple plates 10a through 10u include power generation assemblies and separators. The cell laminate 110 is illustrated to have the plates 10a through 10u, only for convenience of explanation. In the actual state, however, a greater number of plates are typically included in the fuel cell stack. In the event of a crash or collision, various forces are applied to the fuel cell stack according to the type of the crash or collision. For convenience of explanation, it is assumed that the vehicle suddenly stops the motion only in the vehicle longitudinal direction, due to a rear-end collision. In this state, a negative acceleration (deceleration) α works on the vehicle.

The end plates 150 and 160 in the semi-finished fuel cell stack 100h are fastened to the vehicle body and are thereby moved in conjunction with the motions of the vehicle 300. As the deceleration α is applied to the vehicle by a rear-end collision, an inertial force I works on each of the multiple plates 10a through 10u. The inertial force I is expressed as:

$$I = m \cdot \alpha$$

where 'm' represents a mass of each of the plates 10a through 10u. When the multiple plates 10a through 10u have the same mass, the respective plates 10a through 10u receive an identical inertial force I. In the illustration of FIG. 2, the inertial force I is shown by arrows in the front direction.

In the semi-finished fuel cell stack 100h, the respective plates 10a through 10u are interposed between and pressed by the end plates 150 and 160. A frictional force (static frictional force) accordingly acts between respective adjacent pairs of the plates 10a through 10u. A maximum frictional force F is expressed as:

$$F = \rho \cdot P$$

where P represents a pressing force of each plate against an adjacent plate among the plates 10a through 10u, and ρ represents a static friction coefficient. In the illustration of FIG. 2, the frictional force F is shown by arrows in the rear direction.

In the state of applying the inertial force I to the respective plates 10a through 10u, for example, by a rear-end collision, the frictional force works as a reactive force and does not move the respective plates 10a through 10u until the inertial force I reaches the maximum frictional force F. There is accordingly no displacement of any of the plates 10a through 10u. The respective plates 10a through 10u keep their relative positions as long as the inertial force I working on the respective plates 10a through 10u satisfies a relation of:

$$F > I$$

to the maximum frictional force F. Keeping the relative positions results in no displacement of any plate.

In the state of a deceleration by, for example, a collision, each of the plates 10a through 10u included in the semi-finished fuel cell stack 100h has the following relation of the inertial force to the frictional force. The behavior of a plate 10k located on the substantial center of the cell laminate 110 is determined by the relation of the inertial force of the plate 10k alone to the frictional forces acting on respective interfaces between the plate 10k and two adjacent plates 10j and 10L. The behavior of the plate 10a relative to the end plate 150, to which the plate 10a is fastened, depends on the relation of the summation of the inertial forces of the plates 10a through 10j and half of the inertial force of the plate 10k to the frictional force on an interface between the plate 10a and the end plate 150. This is because all the stacked plates 10a through 10u appear to move integrally relative to the end plates 150 and 160 by an abrupt deceleration. Any arbitrary plate among the plates 10a through 10u does not move relative to its adjacent plate as long as the maximum frictional force F exceeds the inertial force I. When the inertial force I exceeds the maximum frictional force F, on the other hand, the arbitrary plate moves relative to its adjacent plate and causes a displacement.

When the semi-finished fuel cell stack 100h receives an inertial force in a direction (in-plane direction) perpendicular to the stacking direction (left-right direction), the frictional force acting on an interface between each adjacent pair of the plates 10a through 10u or the frictional force acting on an interface between the plate 10a and the end plate 150 or between the plate 10u and the end plate 160 works as a drag against the inertial force accumulated in the stacking direction. The maximum frictional force F is proportional to the pressing force P of each plate against an adjacent plate. The pressing force P is restricted by the structure of the fuel cell stack. In some cases, the frictional force F alone may thus be not sufficient for the required drag. In the structure of the embodiment, the displacement preventing members 200 are attached to the semi-finished fuel cell stack 100h, in order to complete the finished fuel cell stack 100 satisfying such a requirement.

Figure 3:
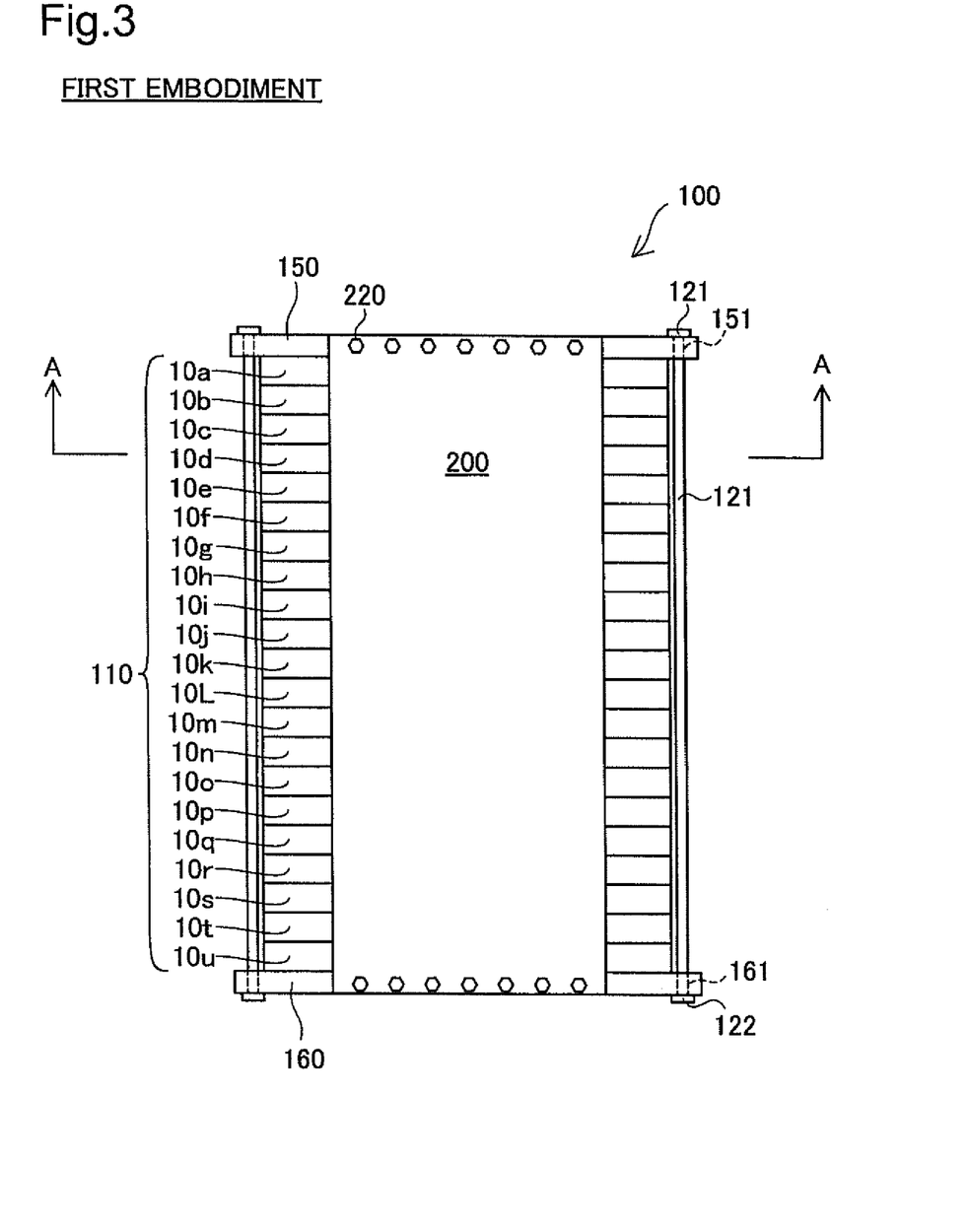
FIG. 3 is an explanatory view showing the structure of a finished fuel cell stack 100 in the first embodiment.

FIG. 3 is an explanatory view showing the structure of a finished fuel cell stack 100 in the first embodiment. The fuel cell stack 100 is produced by attaching and fastening the displacement preventing members 200 to the semi-finished fuel cell stack 100h with fourteen bolts 220 for each member 200. Each of the displacement preventing members 200 has an entire length corresponding to the length of the cell laminate 110 in the stacking direction and is fastened to the pair of end plates 150 and 160 by means of the fourteen bolts 220. The end plates 150, 160 include through holes 151, 161 that receive bolts 121.

Figure 4:
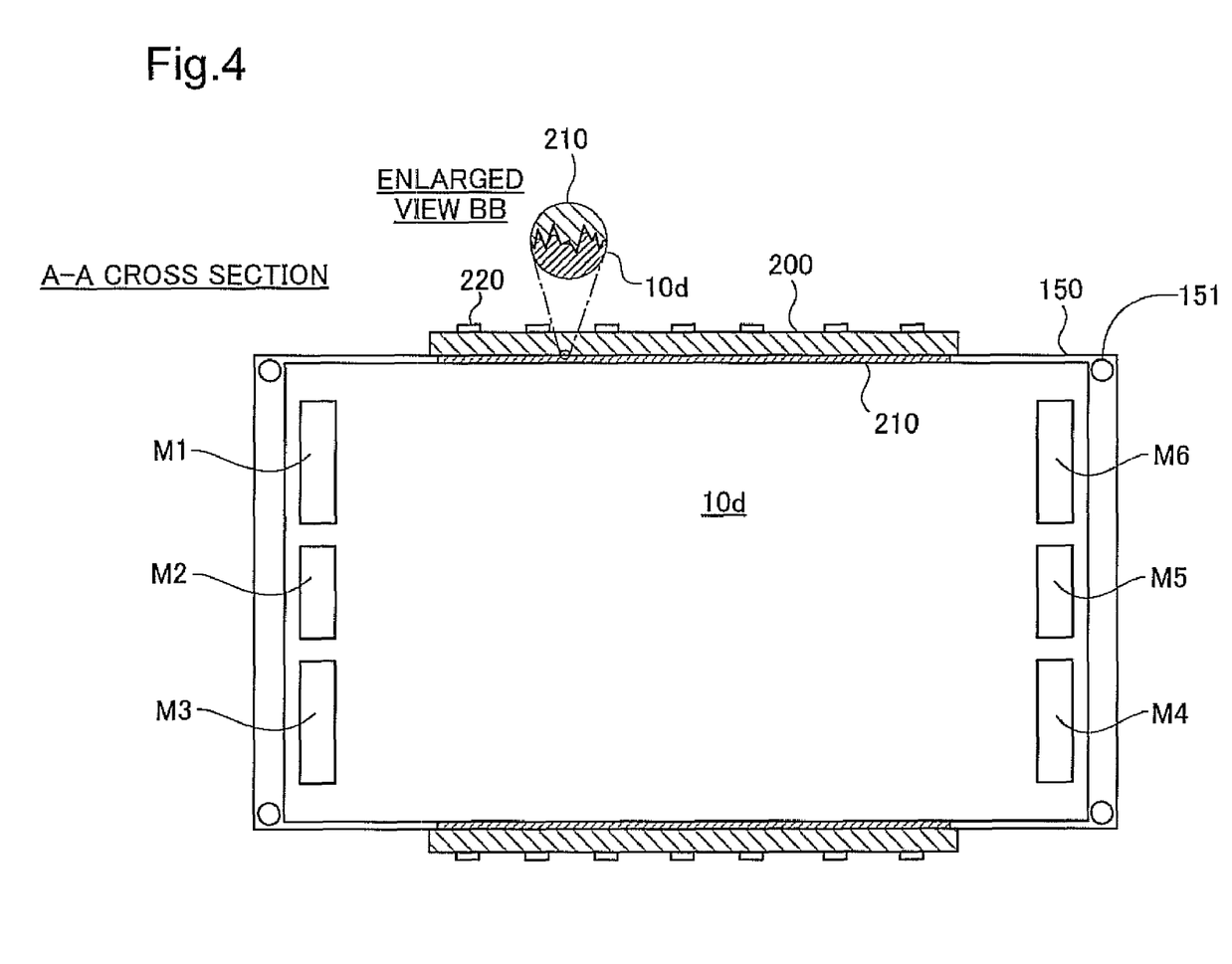
FIG. 4 is an explanatory view showing an A-A cross section of the fuel cell stack 100 in the first embodiment.

FIG. 4 is an explanatory view showing an A-A cross section of the finished fuel cell stack 100 in the first embodiment. A polyurethane sheet 210 having both insulating property and elasticity is interposed between each of the displacement preventing members 200 and the cell laminate 110. The polyurethane sheet 210 has a thickness greater than the distance between the displacement preventing member 200 and the cell laminate 110. Attachment and fixation of the displacement preventing members 200 to the end plates 150 and 160 causes the polyurethane sheets 210 to be compressed and strongly press the end faces of the cell laminate 110 in the top-bottom direction.

In the structure of this embodiment, both the displacement preventing members 200 and the cell laminate 110 have concavo-convex shapes formed on their specific faces that are in contact with the polyurethane sheet 210. An enlarged view BB in FIG. 4 shows a contact region between the polyurethane sheet 210 and the plate 10d. The concavo-convex shapes are provided to make engagement of the displacement preventing member 200 and each of the plates 10a through 10u included in the cell laminate 110 with the polyurethane sheet 210 and increase the friction coefficient. The concavo-convex shapes are obtained by sandblasting, thermal spraying, cutting, or any other suitable surface-shape changing technique. The sandblasting technique gives relatively lower-degree surface roughness (irregular concavity and convexity) of about Ra 0.2 to 20 μm and Rz 1 to 120 μm (see JIS B0601-1994). The thermal spraying technique gives relatively high-degree surface roughness (irregular concavity and convexity) of about Ra 15 to 40 μm and Rz 80 to 200 μm (see JIS B0601-1994). The cutting technique gives larger concavo-convex shapes (regular and irregular concavity and convexity).

The concavo-convex shapes formed on the displacement preventing member 200 and the cell laminate 110 are pressed against the elastic polyurethane sheet 210 to deform the respective contact regions of the polyurethane sheet 210 as shown by the enlarged view BB in FIG. 4. This gives an effect equivalent to the state of engagement of the displacement preventing member and the cell laminate 110 with the polyurethane sheet 210. Such an engagement-like state generates large frictional forces E on the end faces of the respective plates 10a through 10u in the top-bottom direction. The potential displacement of each plate is accordingly determined by the relation of the inertial force I to the summation of the maximum frictional forces F on interfaces between the plate and its adjacent plates and the maximum frictional forces E on interfaces between the end faces of the plate and the displacement preventing members 200.

The structure of the embodiment generates the sufficiently large frictional force without strict requirement for shape tolerances of the displacement preventing members 200 and the end faces of the respective plates 10a through 10u. The displacement preventing member 200 receiving a load by the frictional force has a sufficiently large width in the direction of the load (front-rear direction). The displacement preventing member 200 accordingly has a large contact area with the end faces of the respective plates 10a through 10u and a sufficiently high rigidity in the direction of the inertial force. This arrangement thus effectively prevents displacement of any of the plates 10a through 10u in the cell laminate 110.

The simple structure of the first embodiment using the elastic polyurethane sheets 210 and the highly-rigid displacement preventing members 200 effectively prevents displacement of any of the plates included in the cell laminate.

In the structure of the first embodiment, the polyurethane sheet 210 is located between the cell laminate 110 and the displacement preventing member 200. The polyurethane sheet is, however, neither essential nor restrictive but may be replaced by another elastic material such as a rubber material or by an intermediate material such as a glass epoxy resin, another suitable resin, or an adhesive. Any of such modified structures similarly makes engagement with the concavo-convex shapes formed on the cell laminate 110 and the displacement preventing members 200. In the application of an adhesive, for the enhanced assembling property and reusability, it is desirable to locate a plastic film between at least either of the cell laminate 110 and the displacement preventing member 200 and the adhesive. The surface roughness and the regularity (irregularity) of the concavo-convex shapes should adequately be selected according to the type of the material located between the cell laminate 110 and the displacement preventing members 200.

B. Structure of Fuel Cell Stack in Second Embodiment of the Invention

Figure 5:
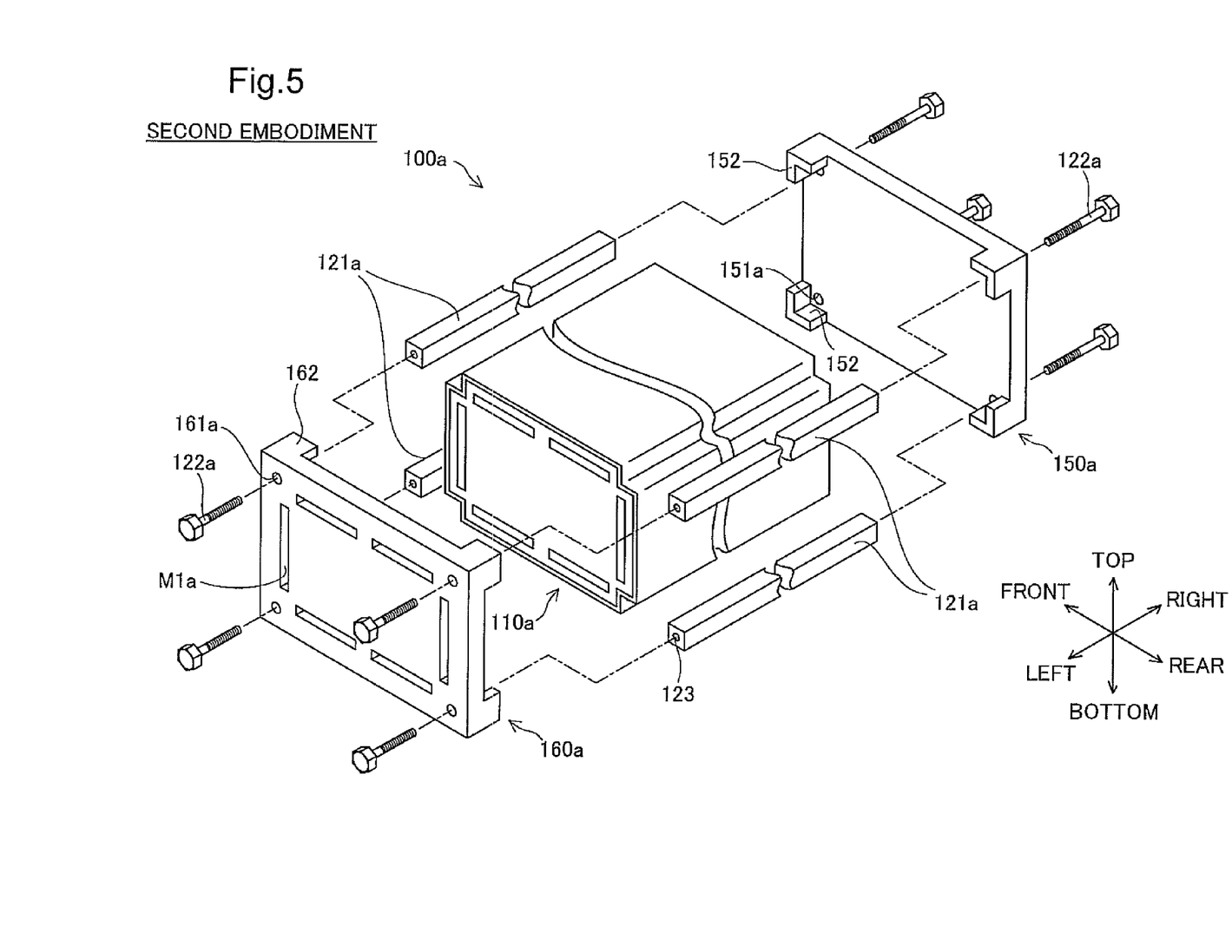
FIG. 5 is an exploded view illustrating a fuel cell stack 100a in a second embodiment of the invention.

FIG. 5 is an exploded view illustrating a fuel cell stack 100a in a second embodiment of the invention. The difference of the fuel cell stack 100a of the second embodiment from the fuel cell stack 100 of the first embodiment is that four studs 121a given as fastener members for fastening end plates 150a and 160a located across a cell laminate 110a are joined and structurally integrated with displacement preventing members 200a (discussed later). For the clarity of explanation, the displacement preventing members 200a are omitted from the illustration of FIG. 5. The coordinate system of FIG. 5 defines directions of the fuel cell stack 100a mounted in a certain orientation on a vehicle (not shown).

The end plates 150a and 160a are located on both ends of the cell laminate 110a in its stacking direction and fastened to the cell laminate 110a with the four studs 121a and eight bolts 122a. The motions of the four studs 121a in directions perpendicular to the stacking direction (a front-rear direction and a top-bottom direction) by four stoppers 152 provided on the end plate 150a and four stoppers 162 provided on the end plate 160a. The end plates 150a, 160a include through holes 151a, 161a that receives bolts 121a.

Figure 6:
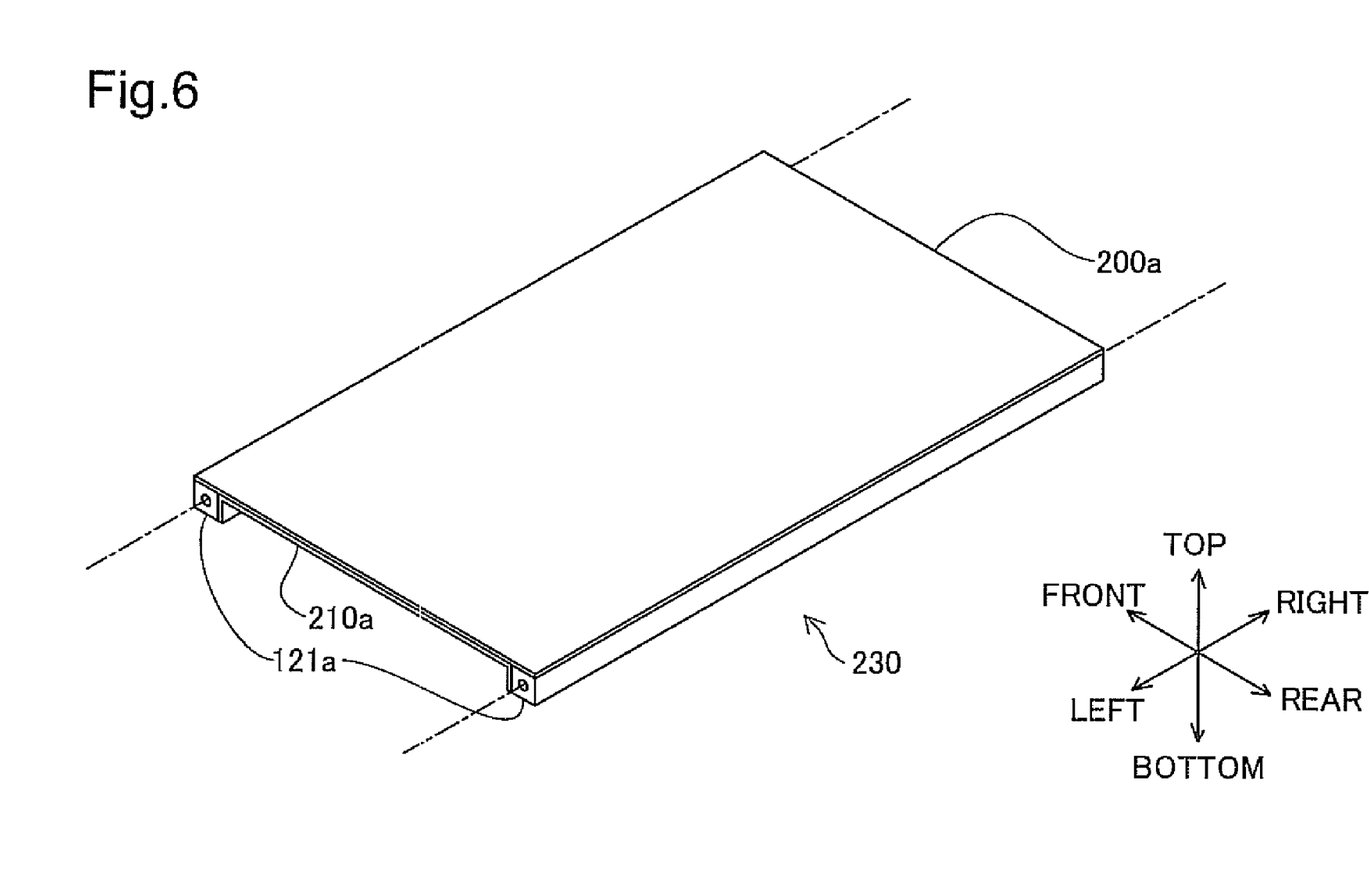
FIG. 6 is an explanatory view showing a displacement preventing member 200a joined and structurally integrated with two studs 121a in the second embodiment.

FIG. 6 is an explanatory view showing the displacement preventing member 200a joined and structurally integrated with the two studs 121a by welding or by means of a fastener member (not shown). The structural integrity allows the two studs 121a to restrict out-of-plane deformation at an end of the displacement preventing member 200a and increases the rigidity of the displacement preventing member 200a. Like the displacement preventing member 200 of the first embodiment, the displacement preventing member 200a of the second embodiment has a sufficiently large width in the direction of the load (front-rear direction) and accordingly has a high rigidity in the direction of the load. The structure of the second embodiment restricts out-of-plane deformation at the end of the displacement preventing member 200a, thus further increasing the rigidity of the displacement preventing member 200a. In the structure of the second embodiment, the corners of the displacement preventing member 200a are restricted by the stoppers 152 and 162. This further increases the rigidity of the displacement preventing member 200a.

A polyurethane sheet 210a with elasticity is bonded to the periphery of the displacement preventing member 200a and the two studs 121a. Like the polyurethane sheet 210 of the first embodiment, the polyurethane sheet 210a of the second embodiment generates a large frictional force between the displacement preventing member 200a and the cell laminate 110a to effectively prevent displacement of each of the plates included in the cell laminate 110a.

Figure 7:
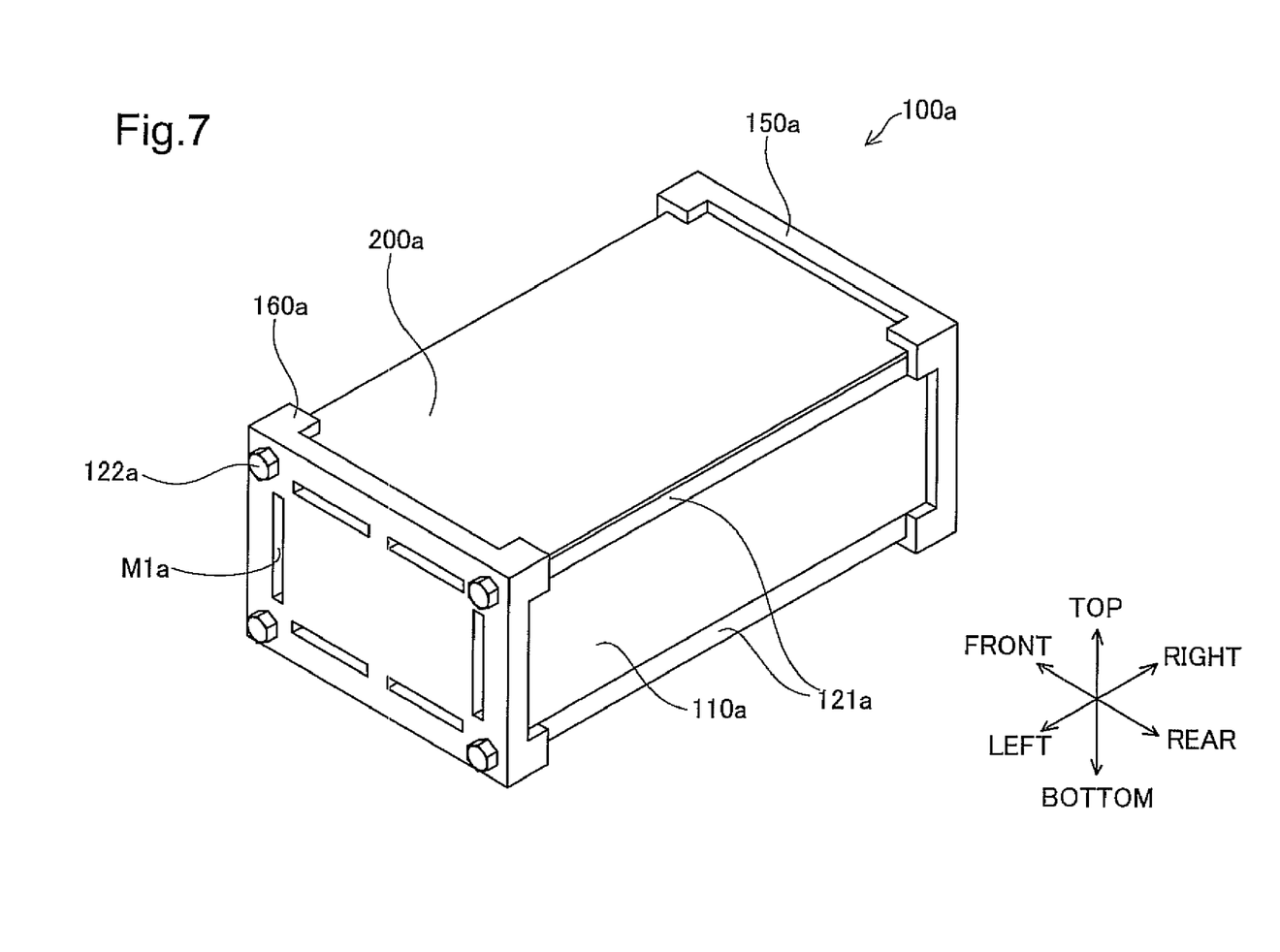
FIG. 7 is an explanatory view showing the structure of the assembled fuel cell stack 100a in the second embodiment of the invention.

FIG. 7 is an explanatory view showing the structure of the assembled fuel cell stack 100a in the second embodiment of the invention. In the assembled state of FIG. 7, structural assemblies 230 (see FIG. 6) produced by structurally integrating the displacement preventing member 200a with the two studs 121a are attached to the cell laminate 110a.

When an inertial force I is applied to the fuel cell stack 100a of the second embodiment by, for example, a collision of the vehicle, the frictional forces acting on interfaces of respective adjacent pairs of the plates and the frictional forces acting on end faces of the respective plates in the top-bottom direction via the polyurethane sheets 210a effectively prevent displacement of any of the plates included in the cell laminate 110a. The elasticity of the polyurethane sheet 210a and concavo-convex shapes formed on the end faces of the cell laminate in the top-bottom direction causes the cell laminate 110a to be engaged with the polyurethane sheet 210a. This engagement state has a high friction coefficient and thereby a high maximum frictional force. The displacement preventing member 200a is fastened by the two studs 121a to strongly press the polyurethane sheet 210a against the end faces of the cell laminate 110a in the top-bottom direction. This arrangement further increases the frictional force.

The highly rigid structural assembly 230 (FIG. 6) produced by structurally integrating the displacement preventing member 200a with the two studs 121a is in contact with the stoppers 152 provided on the end plate 150a and the stoppers 162 provided on the end plate 160a. This arrangement also has the effect of preventing potential deformation of the cell laminate 110a and potential displacement of any of the plates included in the cell laminate 110a.

As discussed above, the structure of the second embodiment uses the studs 121a to compress the pair of end plates 150a and 160a arranged across the cell laminate 110a in the stacking direction. The studs 121a are structurally integrated with the displacement preventing member 200a. The structural integrity increases the forces applied between the cell laminate 110a and the displacement preventing member 200a in the direction perpendicular to the stacking direction. The studs 121a also work to restrict potential deformation of the displacement preventing member 200a. This may decrease the wall thickness of the displacement preventing member 200a.

Figure 8:
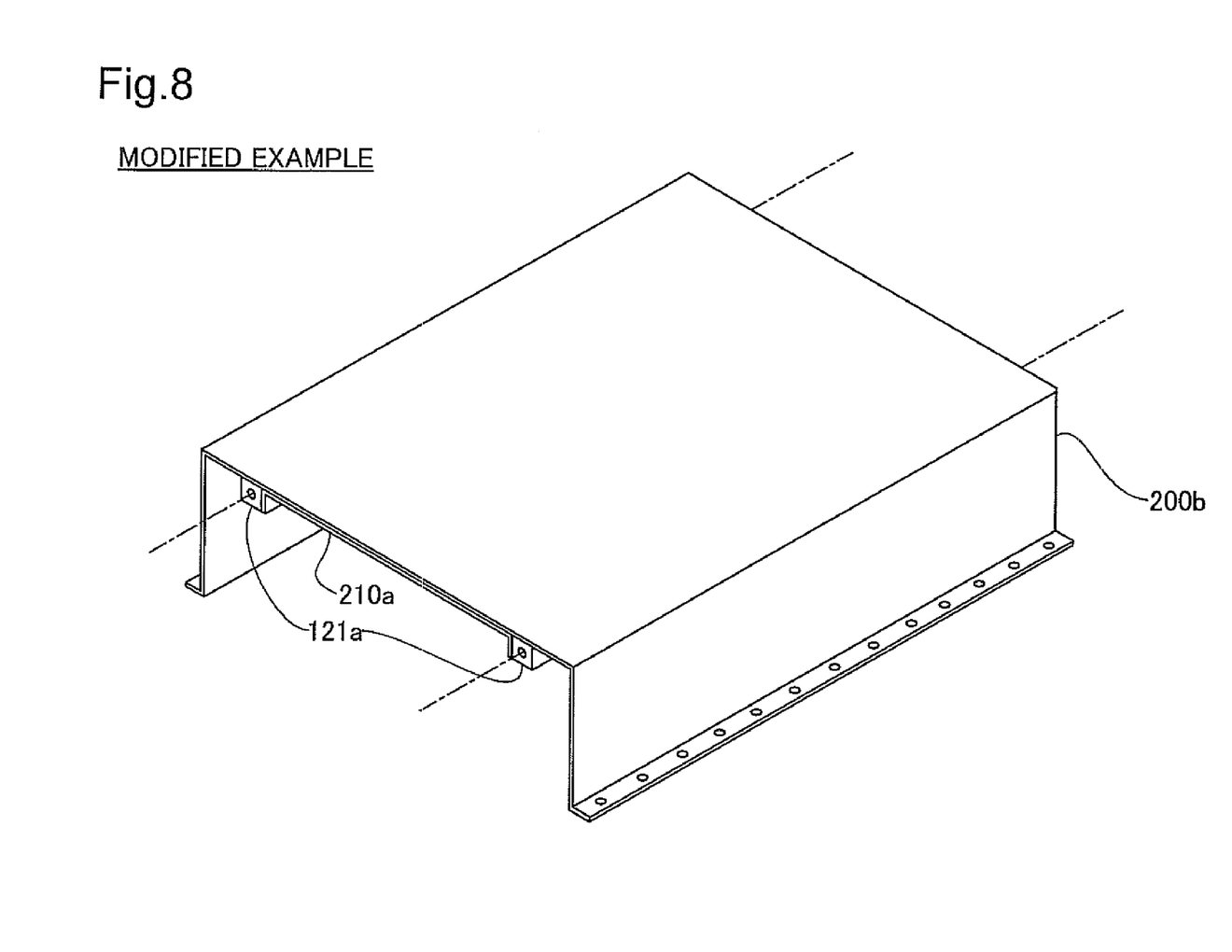
FIG. 8 is an explanatory view showing a displacement preventing member 200b joined and structurally integrated with the two studs 121a in one modified example of the second embodiment.
Figure 9:
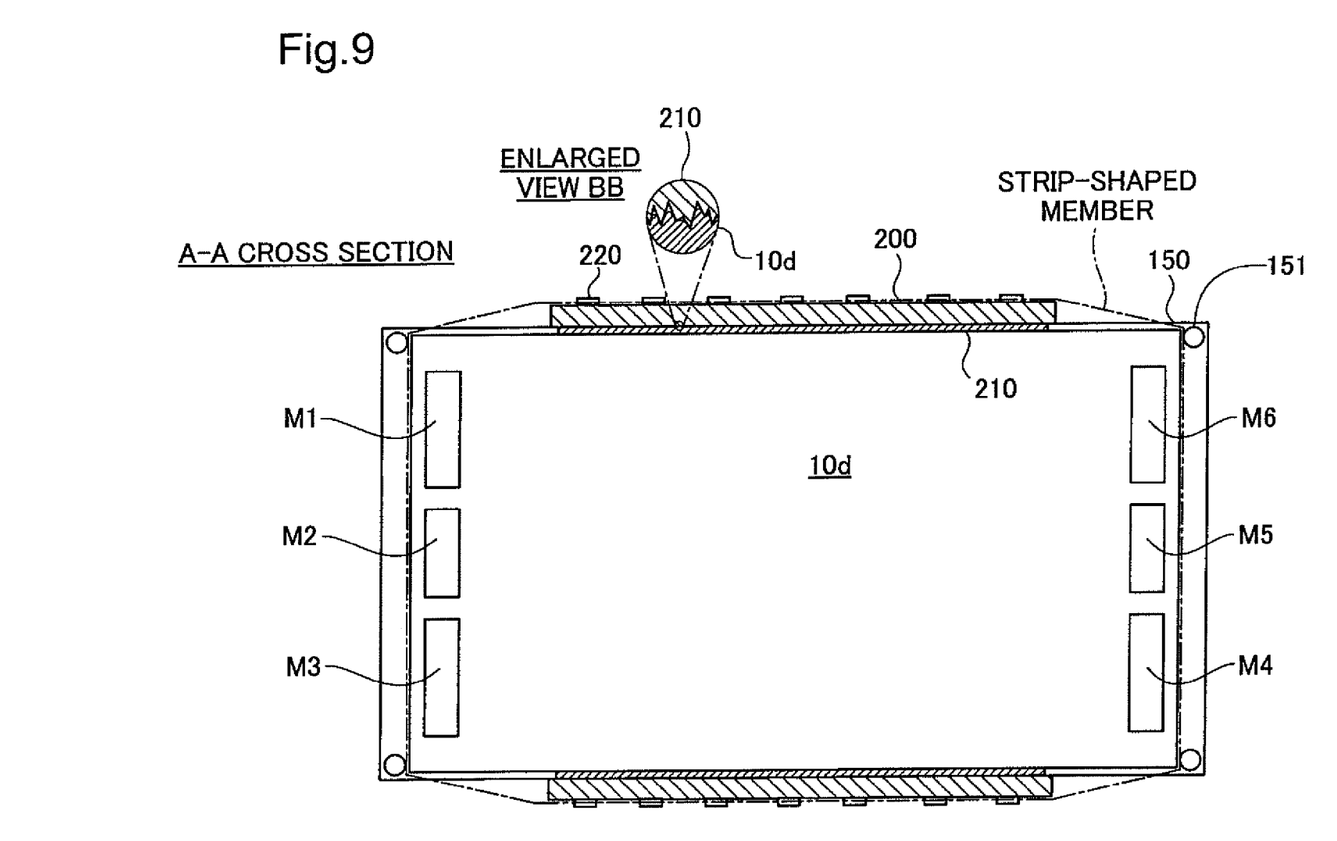
FIG. 9 is an explanatory view showing an A-A cross section of the fuel cell stack detailing the strip shaped member.

In the structure of the second embodiment, the motions of the four studs 121a in the front-rear direction and in the top-bottom direction are restricted by the eight stoppers 152 and 162. One modified example may use stoppers (not shown) for restricting the motions of the studs 121a only in the front-rear direction. In this modified example, displacement preventing members 200b may be constructed as casings that respectively cover over the upper portion and the lower portion of the cell laminate 110a as shown in FIG. 8. In this illustrated example, each of the displacement preventing members 200a is structurally integrated with two studs 121a.

C. Other Aspects

The embodiments and their applications discussed above are to be considered in all aspects as illustrative and not restrictive in any sense. There may be various modifications, changes, and alterations without departing from the scope or spirit of the main characteristics of the present invention. Among the various components included in the structures of the embodiments discussed above, the components other than those disclosed in independent claims are additional elements and may be omitted according to the requirements. Some examples of possible modification are given below.

C-1. In the structures of the first embodiment and the second embodiment discussed above, both the displacement preventing members 200 or 200a and the cell laminate 110 or 110a have the concavo-convex shapes. The concavo-convex shapes may, however, be formed only one of the displacement preventing members 200a or 200a and the cell laminate 110 or 110a. For example, the polyurethane sheet 210 may be bonded to the displacement preventing member 200, while the concavo-convex shapes may be formed only on the face of the cell laminate 110 or vice versa. The concavo-convex shapes may additionally be formed on a face bonded to the polyurethane sheet. Namely the concavo-convex shapes should be formed in a specific area in contact with the intermediate material on at least one of the displacement preventing members 200a or 200a and the cell laminate 110 or 110a.

C-2. In the structures of the first embodiment and the second embodiment discussed above, the polyurethane sheet 210 or 210a is provided between the cell laminate 110 or 110a and the displacement preventing member 200 or 200a over the whole area of the multiple plates 10a through 10u. The polyurethane sheet 210 or 210a should be provided at least partially over the area of the multiple plates 10a through 10u (for example, over an area of two or more plates among the multiple plates 10a through 10u).

C-3. Either of the structures of the first embodiment and the second embodiment discussed above may additionally have a strip-shaped member that is designed to have a closed profile covering over the peripheries of the cell laminate 110 or 110a and the displacement preventing member 200 or 200a about an axis in the stacking direction. The strip-shaped member compresses the displacement preventing member 200 or 200a in a direction opposite to the cell laminate 110 or 110a. In this modified structure, a tensile load generated on the strip-shaped member effectively increases the biasing force of the displacement preventing member.

The present invention may be embodied in other specific forms with some modifications, changes, and alterations without departing from the scope or spirit of the main characteristics of the present invention. The scope of the invention is, therefore, indicated by the appended claims rather than by the foregoing description. All changes that come within the meaning and range of equivalency of the claims are to be embraced within their scope.

The invention claimed is:

1. A fuel cell stack, comprising:
   a cell laminate obtained by stacking multiple plates with at least one of functions of a power generation assembly and a separator;
   a pair of end plates located outside and on both ends of the cell laminate in a stacking direction;
   a displacement preventing member extended along the stacking direction of the cell laminate and fastened to the pair of end plates; and
   a deformable intermediate material located between the cell laminate and the displacement preventing member over an area of two or more plates among the multiple plates,
   wherein each of the multiple plates of the cell laminate includes a concavo-convex shape formed at least partially on a side face in contact with the intermediate material by a surface-shape changing technique.

2. The fuel cell stack in accordance with claim 1, the fuel cell stack further including:
   a fastener member configured to compress and bias the pair of end plates in the stacking direction on both ends of the cell laminate in the stacking direction,
   wherein the fastener member and the displacement preventing member are structurally integrated.

3. The fuel cell stack in accordance with claim 1, wherein the intermediate material is an elastic material, and
   the displacement preventing member is arranged to compress and bias the cell laminate in a direction perpendicular to the stacking direction.

4. The fuel cell stack in accordance with claim 1, the fuel cell stack further including:
   a strip-shaped member having a closed profile covering a periphery of the cell laminate and the displacement preventing member and configured to compress and bias the displacement preventing member from the periphery of the cell laminate.

5. The fuel cell stack in accordance with claim 1, wherein the displacement preventing member is designed to have a concavo-convex shape formed at least partially on a face in contact with the intermediate material.

6. The fuel cell stack in accordance with claim 1, wherein the intermediate material is made of an adhesive,
   the fuel cell stack further having:
   a plastic film located between at least one of the cell laminate and the displacement preventing member and the intermediate material.

* * * * *

UNITED STATES PATENT AND TRADEMARK OFFICE
CERTIFICATE OF CORRECTION

| | |
|---|---|
| PATENT NO. | : 8,318,372 B2 |
| APPLICATION NO. | : 12/597265 |
| DATED | : November 27, 2012 |
| INVENTOR(S) | : Norihiko Saito |

It is certified that error appears in the above-identified patent and that said Letters Patent is hereby corrected as shown below:

In the Specification

Col. 4, line 51: replace "a works" with --α works--

Signed and Sealed this
Twenty-second Day of April, 2014

Michelle K. Lee
*Deputy Director of the United States Patent and Trademark Office*